(12) United States Patent
Smithe et al.

(10) Patent No.: US 8,495,878 B1
(45) Date of Patent: Jul. 30, 2013

(54) FEEDWATER HEATING HYBRID POWER GENERATION

(75) Inventors: Alan Roger Smithe, Palm Coast, FL (US); Mackenzie Brooke Miller, Saint Augustine, FL (US); Philip J Dirkse, Saint Augustine, FL (US); Seth Shortlidge, Saint Augustine, FL (US)

(73) Assignee: EIF NTE Hybrid Intellectual Property Holding Company, LLC, Needham, MA (US)

( * ) Notice: Subject to any disclaimer, the term of this patent is extended or adjusted under 35 U.S.C. 154(b) by 0 days.

(21) Appl. No.: 13/596,945

(22) Filed: Aug. 28, 2012

Related U.S. Application Data

(60) Provisional application No. 61/621,772, filed on Apr. 9, 2012.

(51) Int. Cl.
*F01K 7/34* (2006.01)
*F01K 13/00* (2006.01)

(52) U.S. Cl.
USPC ............... 60/653; 60/654; 60/676; 60/678

(58) Field of Classification Search
USPC ............... 60/653, 654, 676, 677, 678, 679, 60/680
See application file for complete search history.

(56) References Cited

U.S. PATENT DOCUMENTS

| | | | | |
|---|---|---|---|---|
| 3,016,712 A | * | 1/1962 | Taylor | 60/676 |
| 3,264,826 A | * | 8/1966 | Kane et al. | 60/646 |
| 3,362,163 A | * | 1/1968 | Pacault | 60/676 |
| 3,937,024 A | | 2/1976 | Durrant et al. | |
| 4,013,877 A | | 3/1977 | Uram et al. | |
| 4,060,990 A | | 12/1977 | Guido et al. | |
| 4,069,674 A | * | 1/1978 | Warren | 60/641.8 |
| 4,069,675 A | | 1/1978 | Adler et al. | |
| 4,195,231 A | | 3/1980 | Reed et al. | |
| 4,288,979 A | | 9/1981 | Liljedahl et al. | |
| 4,326,382 A | | 4/1982 | Baardson | |
| 4,414,813 A | | 11/1983 | Knapp | |
| 4,541,247 A | | 9/1985 | Martin | |
| 4,686,832 A | * | 8/1987 | Miliaras | 60/676 |
| 5,319,934 A | | 6/1994 | Parker, III et al. | |
| 5,442,908 A | | 8/1995 | Briesch et al. | |
| 5,581,128 A | | 12/1996 | Royle | |
| 5,607,011 A | | 3/1997 | Abdelmalek | |

(Continued)

OTHER PUBLICATIONS

Florida Power & Light Company's Petition for Solar Energy Projects for Recovery through Environmental Cost Recovery Clause before The Florida Public Service Commission; 21 pages (2008).

(Continued)

*Primary Examiner* — Hoang Nguyen
(74) *Attorney, Agent, or Firm* — Pierce Atwood LLP; Joseph M. Maraia

(57) ABSTRACT

The technology combines a secondarily-fueled boiler with a primary-fueled Rankine steam cycle combustion system in a hybrid process. Outputs from a secondarily-fueled combustion system are fed into the feedwater heater(s), deaerators, feedwater heating lines, and/or reheat lines of a primary-fueled Rankine system. The integrated steam flow eliminates or reduces one or more extractions from the steam turbine generator, thereby allowing it to generate more electrical power using the same Rankine system input energy or generate equivalent electrical power using energy inputs from multiple fuel sources. The technology can be utilized in any type and/or configuration of secondary fuel or secondarily-fueled combustion technology and/or can utilize any type of primary-fueled steam source.

16 Claims, 7 Drawing Sheets

U.S. PATENT DOCUMENTS

| | | | |
|---|---|---|---|
| 5,649,416 | A | 7/1997 | Moore |
| 5,720,165 | A | 2/1998 | Rizzie et al. |
| 5,724,807 | A | 3/1998 | Schuetzenduebel et al. |
| 5,761,896 | A | 6/1998 | Dowdy et al. |
| 5,822,974 | A | 10/1998 | McGowin et al. |
| 6,065,280 | A | 5/2000 | Ranasinghe et al. |
| 6,116,017 | A | 9/2000 | Mori et al. |
| 6,244,039 | B1 | 6/2001 | Sugishita et al. |
| 6,339,926 | B1 | 1/2002 | Ichiro et al. |
| 6,430,914 | B1 | 8/2002 | Goidich et al. |
| 6,497,102 | B2 | 12/2002 | Liebig |
| 6,604,354 | B2 | 8/2003 | Oto et al. |
| 6,606,848 | B1 | 8/2003 | Rollins, III |
| 6,663,777 | B2 | 12/2003 | Schimel |
| 6,748,733 | B2 | 6/2004 | Tamaro |
| 6,817,186 | B2 | 11/2004 | Tanaka |
| 6,923,004 | B2 | 8/2005 | Chandran et al. |
| 6,957,540 | B1 | 10/2005 | Briesch et al. |
| 6,966,190 | B2 | 11/2005 | Wylie |
| 7,272,934 | B2 | 9/2007 | Chandran et al. |
| 7,299,637 | B2 | 11/2007 | Becker |
| 7,331,178 | B2 | 2/2008 | Goldman |
| 7,367,177 | B2 | 5/2008 | Briesch |
| 7,377,107 | B2 | 5/2008 | Sugioka |
| 7,596,939 | B2 | 10/2009 | Kataoka et al. |
| 7,640,750 | B2 | 1/2010 | Saviharju et al. |
| 7,803,333 | B2 | 9/2010 | Buchert |
| 7,841,304 | B2 | 11/2010 | Van Wees et al. |
| 7,845,172 | B2 | 12/2010 | Goldman |
| 8,056,316 | B2 | 11/2011 | Poline |
| 8,161,724 | B2 * | 4/2012 | Shortlidge et al. ......... 60/39.182 |
| 2003/0136127 | A1 | 7/2003 | Thiessen |
| 2005/0034445 | A1 | 2/2005 | Radovich |
| 2006/0225428 | A1 | 10/2006 | Brostmeyer |
| 2007/0012041 | A1 | 1/2007 | Goldman |
| 2007/0084208 | A1 | 4/2007 | Goldman |
| 2007/0157614 | A1 | 7/2007 | Goldman |
| 2007/0271899 | A1 | 11/2007 | Nakagawa et al. |
| 2008/0000237 | A1 | 1/2008 | Briesch et al. |
| 2008/0000436 | A1 | 1/2008 | Goldman |
| 2008/0115500 | A1 | 5/2008 | MacAdam et al. |
| 2009/0031698 | A1 | 2/2009 | Brown et al. |
| 2009/0094983 | A1 | 4/2009 | Goto et al. |
| 2009/0183693 | A1 | 7/2009 | Furman |
| 2009/0282738 | A1 | 11/2009 | Tharpe, Jr. |
| 2010/0003741 | A1 | 1/2010 | Fromson |
| 2011/0016789 | A1 | 1/2011 | Nukumi et al. |
| 2011/0036090 | A1 * | 2/2011 | Rop ............................ 60/641.8 |
| 2011/0146155 | A1 | 6/2011 | Bentzen |
| 2011/0209647 | A1 | 9/2011 | Mitchell et al. |

OTHER PUBLICATIONS

Florida Power & Light Company's Petition for Solar Energy Projects for Recovery through Environmental Cost Recovery Clause before The Florida Public Service Commission; Direct Testimony and Exhibits of Eric Silagy; 85 pages (2008).

Mouawad, Jad; "The Newest Hybrid Model"; New York Times; 2 pages; Mar. 4, 2010.

International Search Report; International Searching Authority; PCT/US2011/061899; Dec. 14, 2011.

* cited by examiner

SUMMARY TABLE:
FEEDWATER HEATER HYBRID CYCLE SCHEMATIC

| | TITLE | FUEL SUPPLY | | GROSS POWER (MW) | PARASITIC POWER (MW) | NET POWER (Mw) | NET HEAT RATE (BTU/kWh, HHV) | WOOD COMPONENT HEAT RATE (BTU/kWh, HHV) |
|---|---|---|---|---|---|---|---|---|
| | | COAL (mmBTU/hr) | BIOMASS (mmBTU/hr) | | | | | |
| Fig. 1 | Existing Coal Plant | 3,422 | - | 360 | 29 | 331 | 10,338 | N/A |
| Fig. 2 | Hybrid, Coal and Biomass, FWH 3 | 3,422 | 330 | 386 | 31 | 355 | 10,569 | 13,750 |
| Fig. 5 | Hybrid, Coal and Biomass, FWH 2 & 3 | 3,570 | 601 | 419 | 34 | 385 | 10,834 | 15,144 |
| Fig. 6 | Hybrid, Coal and Biomass, FWH 3 & CRH | 3,535 | 617 | 423 | 35 | 388 | 10,701 | 13,393 |

FIG. 7

FEEDWATER HEATING HYBRID POWER GENERATION

RELATED APPLICATIONS

This application claims the benefit of U.S. Provisional Application No. 61/621,772, filed on Apr. 9, 2012, the entire teachings of which are herein incorporated by reference.

FIELD OF THE TECHNOLOGY

The described technology relates generally to methods and systems for the generation of electrical power through a hybrid, combustion-based energy system. More specifically, the technology is directed at methods and systems for feeding steam outputs from a secondary combustion system into one or more feedwater heater(s) of a Rankine steam cycle combustion system (also referred to as the technology).

BACKGROUND

Often, utilities and other users of combustion-based energy generation systems seek flexibility in the type and quantity of fuel used to produce electrical power. Fuel flexibility permits such entities to reduce exposure to fuel supply shortages, mitigate and/or exploit fluctuations in fuel prices, and even take advantage of government incentive programs. However, fuel flexibility is highly limited when co-firing multiple fuels in one combustion system (e.g., burning coal and biomass in the same furnace) due to emissions compliance, operability, and maintainability issues. Such issues typically include, although are not limited to, difficulty controlling varying emissions profiles and/or fouling and agglomeration. Therefore, gaining additional flexibility may require separate combustion systems for each fuel type.

However, there are also numerous disadvantages to operating multiple parallel, standalone energy production facilities. Operating separate facilities requires parallel equipment and labor, demands higher fixed operating and maintenance costs, suffers greater inefficiencies due to parallel parasitic loads, etc. Furthermore, limitations on supportable combustion system size for certain fuel types (e.g., due to lower temperature capability, pressure capability, high moisture content, etc.) can result in even greater inefficiencies. Accordingly, separate energy generating facilities provide substantially less efficient energy production than would be achievable in a single, larger, integrated facility.

SUMMARY

A need therefore exists for a hybrid, combustion-based energy system capable of using multiple fuel types.

The enhanced efficiency of the technology is achieved by combining a secondarily-fueled boiler with a primary-fueled Rankine steam cycle combustion system power plant (Rankine system) in a hybrid process. Outputs from a secondarily-fueled boiler combustion system are fed into the feedwater heater(s), deaerators, and/or reheat lines of a Rankine system. The integrated steam flow eliminates or reduces one or more extractions from the steam turbine generator, thereby allowing it to generate more electrical power using the same Rankine system input energy or generate equivalent electrical power using energy inputs from multiple fuel sources. The technology can be utilized in any type and/or configuration of secondary fuel or secondarily-fueled combustion technology and/or can utilize any type of primary-fueled steam source.

In some embodiments, a system for generating electrical power is provided comprising a first boiler system configured to produce a first steam flow, a turbine configured to process the first steam flow to produce electricity, one or more extractions from the turbine configured to produce a heated feedwater flow via one or more feedwater heaters/deaerators, a second boiler system configured to produce a second steam flow, and at least one steam line configured to route at least a first part of the second steam flow to at least one of the one or more feedwater heaters/deaerators.

In other embodiments, a method for generating electrical power is provided comprising the steps of processing, via a first boiler system, a first energy source to produce a first steam flow, processing the first steam flow through a steam turbine to produce electricity, taking one or more extractions from the steam turbine to produce a heated feedwater flow via one or more feedwater heaters/deaerators, processing, via a second boiler system, a second fuel source to produce a second steam flow, routing at least part of the second steam flow to at least one of the one or more feedwater heaters/deaerators, and routing at least part of the heated feedwater flow to the first boiler system.

In still further embodiments, a method for generating electrical power is provided comprising the steps of processing, via a first boiler system, a first energy source to produce a first steam flow, processing the first steam flow through a steam turbine to produce electricity, taking one or more extractions from the steam turbine to produce a heated feedwater flow via one or more feedwater heaters/deaerators, routing at least part of the heated feedwater flow to a second boiler system, processing, via the second boiler system, a second fuel source to produce a second steam flow, and routing at least part of the second steam flow to the first boiler system cold reheat.

The system and methods of the technology allow for more efficient energy production from multiple fuel sources than is achievable in one or more parallel, standalone facilities, thereby decreasing the cost to produce electricity from each particular fuel. Because the technology enables the combination of the steam from a secondarily-fueled boiler with steam from a primary-fueled Rankine system, the technology enables the use of a single, larger, utility-class steam turbine generator for producing energy from multiple fuels and/or fuel types. Using a single utility-class steam turbine generator has several benefits for the steam cycle efficiency compared to operating multiple separate, stand-alone, utility-scale steam turbine generators, such as reducing or eradicating the parallel costs and inefficiencies described hereinabove.

Still further benefits are realized when certain secondary fuels, which are limited by temperature and pressure constraints, are used with the technology. Such limitations constrain the ability to integrate lower pressure and temperature supplemental steam into a high pressure and temperature, utility-scale Rankine system. These secondary fuels (e.g., various types of biomass, high-chlorine MSWs, RDFs, and SRFs are therefore often limited to smaller, industrial-class steam turbine generators. Because utility-class steam turbine generators are markedly more efficient than industrial-class steam turbine generators, the ability to use such constrained secondary fuels in conjunction with a utility-class steam turbine generator provides even greater efficiencies to the present system and methods over traditional systems for generating electrical power from such fuels.

Accordingly, in some embodiments, the technology significantly expands the number of facilities that can benefit from the capital and operating efficiencies of a hybrid, utility-scale power generation cycle by integrating lower pressure and temperature, secondarily-fueled boilers into high pressure and temperature, primary-fueled Rankine systems.

Yet more benefits are realized because the secondary fuel is combusted separately from the combustion processes of the Rankine system in separate, secondarily-fueled boilers. Combustion of different fuels in independent boilers and/or furnaces avoids operability complications, such as agglomeration. Furthermore, such separated combustion creates flexibility when processing the combusted gases. In some embodiments, the gases from a secondarily-fueled boiler may be processed separately by using a dedicated emissions control system that is customized to the secondary fuel. In other embodiments, the gases may be combined with combusted gases from the primary-fueled boiler and processed via a common equipment train. This allows secondary fuels to offset the primary fuels ordinarily used to provide feedwater heating steam without the emissions or operability complications incurred by co-firing multiple fuels in the same furnace.

Thus, the technology has one or more of the following advantages. First, the steam from the secondarily-fueled boiler can operate in a reheat type Rankine system, which increases the incremental secondary fuel energy generation efficiency. Second, utility-scale steam turbine generators have inherently higher efficiencies than industrial-scale steam turbine generators. Third, the parasitic loads from shared cooling cycle and other auxiliary equipment are less than those for parallel, standalone loads at equivalent power generation. Fourth, low grade heat sources available in utility-scale steam cycles are more efficiently utilized in combination with a secondarily-fueled boiler. Fifth, through the co-location of the secondarily-fueled facility and the primary-fueled facility, fixed operating and maintenance costs will be lower on a per unit basis due to the ability to share common plant staff and infrastructure. Sixth, the technology enables the introduction of secondarily-fueled steam generation for feedwater heating as a supplement for primary-fueled Rankine system steam generation, which advantageously provides fuel flexibility. Seventh, the flexibility to use separate boilers avoids common operability and emissions issues associated with co-firing diverse fuel types.

BRIEF DESCRIPTION OF THE DRAWINGS

The foregoing and other objects, features, and advantages will be apparent from the following more particular description of the embodiments as illustrated in the accompanying drawings in which like reference characters refer to the same parts throughout the different views. The drawings are not necessarily to scale, emphasis instead being placed upon illustrating the principles of the embodiments.

FIG. 7 shows a heat balance summary table for an exemplary typical Rankine system as well as three exemplary configurations of the technology. FIGS. 1, 2, 5, and 6 correspond to the four configurations described by the table in FIG. 7.

DETAILED DESCRIPTION

Figure 1:
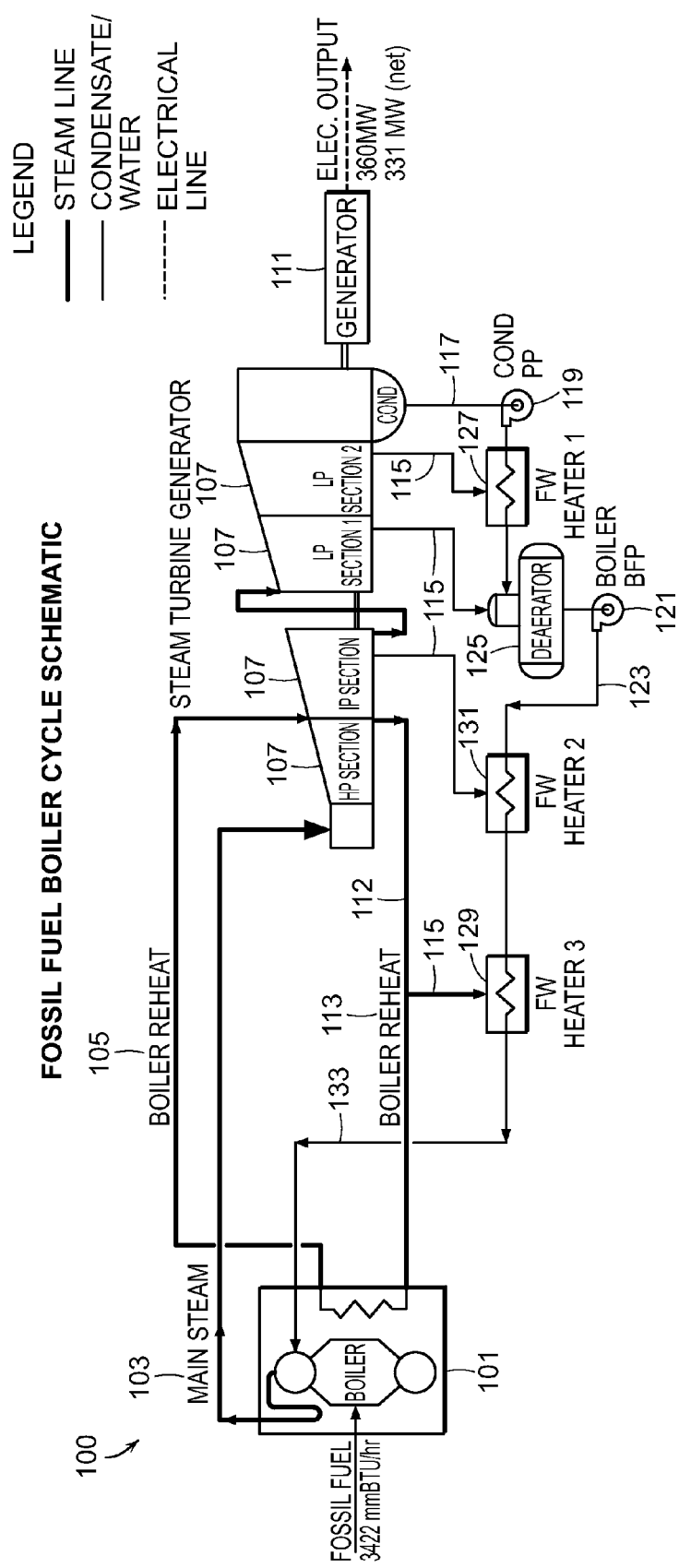
FIG. 1 shows a traditional primary-fueled reheat Rankine system having a multi-stage steam turbine generator.

The technology enables consolidation of multiple fuel sources into a single, hybrid, combustion-based energy system by combining the steam from at least one secondarily-fueled boiler with steam from a primary-fueled Rankine system. In some embodiments, steam outputs from a secondarily-fueled combustion system may be fed into the feedwater heater(s) of a primary-fueled Rankine system. Feedwater heaters of some such embodiments may integrate the secondarily-fueled steam outputs via a heat exchanger, while others may introduce this steam directly into a feedwater or reheat line. In many such embodiments, the integrated steam flow may eliminate or reduce one or more extractions from the steam turbine generator, thereby allowing it to generate more electrical power using the same Rankine system primary fuel input energy. Furthermore, while temperature and pressure constraints limit some secondary fuels, when used separately, to industrial (or smaller-scale) boiler/turbine energy systems, integration of secondary fuel steam as disclosed herein allows for successful integration of steam at any pressure and temperature.

The term feedwater heater may refer to any direct or indirect heat exchanger designed to transfer heat from a steam source to feedwater. Feedwater heater is also understood herein to include deaerator(s). It should be further understood that any steam routed to a feedwater heater may alternatively or additionally be routed to any feedwater and/or reheat lines.

The term fuel is understood herein to include any fossil fuel, municipal solid waste (MSW), refuse derived fuel (RDF), specified recovered fuel (SRF), or biomass. Fossil fuels may include, for example, gasoline, oil, natural gas, coal, etc. MSWs include, but are not limited to, food wastes, yard wastes, containers and product packaging, and other miscellaneous wastes from residential, commercial, institutional, and industrial sources. RDFs include any fuel produced from any MSW or other form of garbage, most typically after combustible elements of MSW are separated, dehydrated, and/or shredded. SRFs include any RDFs produced to meet a particular specification. Biomass may include fuels such as, for example, any plant or animal matter, including, but not limited to trees, grass, corn, sugarcane, crop waste, animal waste (e.g., dung, fats, or meat byproducts), green tree chips, forest residues, yard clippings, wood chips, urban waste wood, construction and demolition waste wood, sugar cane fiber (bagasse), other agricultural waste, and/or any other plant or animal material,. It will be further apparent in view of this disclosure that any combination of two or more fuels may also herein be referred to by the term fuel.

The term secondarily-fueled combustion technology refers to any method for combusting a fuel, including, for example, the use of stoker firing, bubbling fluid bed technology, circulating fluid bed technology, and/or any other method of combustion or fuel processing for the production of steam. Steam generated from a primary fuel can similarly be obtained by any means known in the art and the technology is not limited to any specific method.

FIG. 1 shows a traditional, primary-fueled Rankine system 100 having a multi-stage steam turbine generator. This prior art example includes a primary-fueled boiler 101, which generates both main steam 103 and reheated steam 105, which are then routed to a steam turbine generator having multiple sections or stages 107. The turbine 107 drives a generator 111, which extracts work from the main steam 103 and reheat steam 105. The outputs of the steam turbine are cold reheat steam 112, steam extractions for feedwater heating 115, and/or condensate 117. The cold reheat steam 112 is at least partially routed via a cold reheat line 113 back through the primary-fueled boiler 101 while the steam extractions for feedwater heating 115 and/or condensate 117 are routed or pumped (e.g., by a condensate pump 119 and/or a boiler feedwater pump 121) through a feedwater heating line into at least one deaerator 125 and/or feedwater heater (e.g., a relatively cold feedwater heater such as the first feedwater heater 127, a relatively hot feedwater heater such as the third feedwater heater 129, and/or any intermediate feedwater heater such as the second feedwater heater 131). Following feedwater heating, the heated feedwater 133 is routed back into the primary-fueled boiler 101 and the cycle renews.

In particular, FIG. 1 depicts one example such power plant, which operates on one primary fossil fuel only. The example plant depicted in FIG. 1 uses 3,422 MMBtu/hr (HHV) of fossil fuel to produce 360 MW in the steam turbine and loses 29 MW to parasitic loads, resulting in 331 MW of net power produced.

Figure 2:
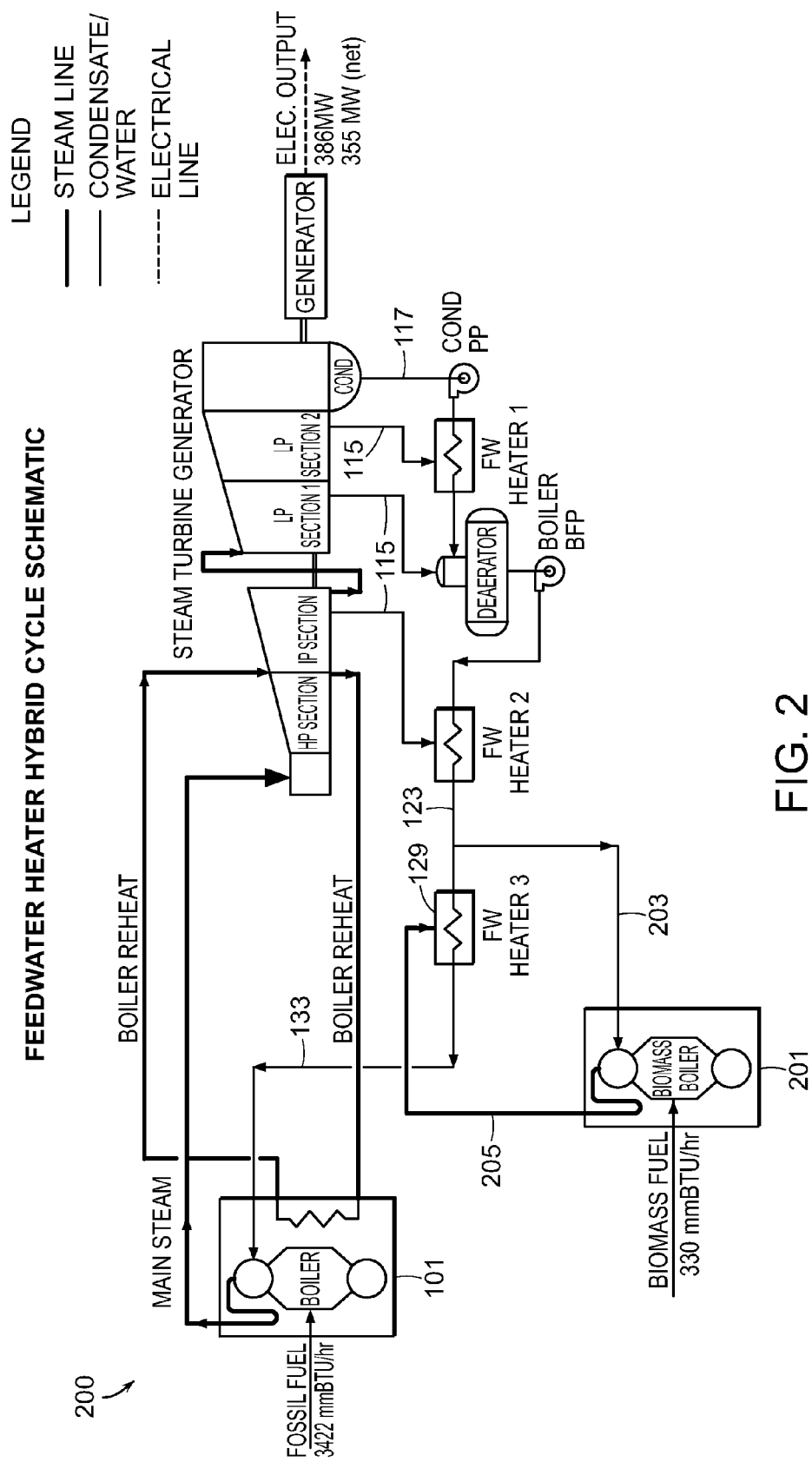
FIG. 2 shows a hybrid, combustion-based energy system in accordance with various embodiments of the present disclosure having a secondarily-fueled boiler integrated with a primary-fueled Rankine system having a multi-stage steam turbine generator.

FIG. 2 shows a hybrid, combustion-based energy system 200 having a secondarily-fueled boiler integrated with a primary-fueled Rankine system having a multi-stage steam turbine generator. The example embodiments depicted in FIG. 2 include a secondarily-fueled boiler 201 which receives diverted primary feedwater 203 from the feedwater heating line 123 and outputs supplemental steam 205, which introduces the supplemental steam to a feedwater heater (or heat exchanger) and/or deaerator (e.g., the third feedwater heater 129 as shown). Subsequently, the heated feedwater 133 is routed to the primary-fueled boiler 101 as described in conjunction with FIG. 1.

In general, although not in all potential embodiments, the steam generation process for the secondarily-fueled portion will operate in a similar manner to parallel, standalone secondarily-fueled power generation projects with the exception that the steam is not directly routed to a dedicated steam turbine generator. Instead, the steam generated from the secondarily-fueled portion is directed to one or more feedwater heaters or deaerators. It will be apparent in view of this disclosure that the amount of steam coming from the secondarily-fueled boiler is arbitrary and will vary greatly depending on the amount of a particular secondary fuel available, desired performance objectives, and limitations of the primary Rankine cycle equipment.

In particular, FIG. 2 depicts one example such hybrid power plant wherein the primary fuel is a fossil fuel, a secondarily-fueled boiler is used, and the secondary fuel is a biomass. However, it will be apparent in view of this disclosure that any fuel or appropriate combination of fuels as defined above may be used as a primary fuel and/or a secondary fuel. For illustrative purposes, FIG. 2 continues with the fossil-fueled boiler power plant described in FIG. 1 and adds a 330 MMBtu/hr (HHV) biomass boiler, which supplies steam to the final stage feedwater heater. This example hybrid power plant produces 386 MW in the steam turbine while losing only 31 MW to parasitic loads, resulting in 355 MW of net power produced.

Although FIG. 2 illustrates that the steam from the secondarily-fueled boiler is routed to the final stage feedwater heater, the steam from the secondarily-fueled boiler may be routed into any stage feedwater heater, any deaerator, any cold or heated feedwater heating line, any cold or heated reheat line, directly into a primary-fueled boiler 101, and/or any other desired location. The technology may be utilized in any type and/or configuration of secondary fuel or secondarily-fueled combustion technology and/or may utilize any type of primary-fueled steam source. For example, one configuration may route the steam from a secondarily-fueled boiler to one or more feedwater heaters. In other embodiments, at least a portion of the primary feedwater 203 is diverted to one or more secondarily-fueled boilers 201, the output steam of which is routed directly into the primary-fueled boiler as heated feedwater 133 and/or cold reheat steam 112 flow.

In some examples, the hybrid cycle includes a single stage feedwater heater and the steam from the secondarily-fueled boiler is routed into the single stage feedwater heater. In other examples, the hybrid cycle includes a plurality of stages of feedwater heating. In such examples, the steam from the secondarily-fueled boiler may be routed into one or more of the stages of the feedwater heater. In further examples, the feedwater heating stage includes a plurality of cascading feedwater heaters. The cascading feedwater heaters may be inter-connected to each other, the steam turbine generator, the secondarily-fueled boiler, and/or any other part of the power generation components. In still further examples, steam from the secondarily-fueled boiler may be routed directly into any feedwater heater, reheat line, and/or the primary-fueled boiler.

In further alternate embodiments, the steam from the secondarily-fueled boiler utilizes a heat exchanger (e.g. 125, 127, 129, and 131 as shown) to transfer heat to the water in the feedwater heater. In other examples, the temperature and pressure of the steam from the secondarily-fueled boiler can match (e.g., within ±10%, within ±1%, etc.) the temperature and pressure of the steam turbine extractions feeding a particular feedwater heater and thus feed directly into the feedwater heater. In still other examples, the steam from the secondarily-fueled boiler may be combined with the water in a relatively cold feedwater heater (e.g., the first feedwater heater 127) or deaerator 125. In yet further embodiments, a portion of the steam from the secondarily-fueled boiler may be diverted for use as host steam for cogeneration applications (e.g., combined heat and power) and/or any other application for which Rankine system turbine extractions may ordinarily be used.

The technology is especially useful for pre-existing plants where the primary-fueled component of a potential hybrid system operates most efficiently at a high steam temperature and pressure. In such facilities there previously may have been an inability to match or integrate associated with incorporating steam from a secondarily-fueled boiler. However, the technology enables secondarily-fueled boilers to be used in a hybrid cycle regardless of the secondarily-fueled boiler's ability to match high temperature and pressure steam conditions required at a steam turbine high pressure inlet, allowing any pre-existing plant to incorporate the technology. In other words, the pressure and temperature condition of the steam from a secondarily-fueled boiler does not have to match, or even substantially match, the pressure and temperature conditions of the main steam (or even the extraction steam) from the primary-fueled boiler.

Additionally, because the secondary fuel is combusted separately from the combustion processes of the Rankine system in separate, secondarily-fueled boilers, operability complications, such as agglomeration, are avoided. Furthermore, such separated combustion creates flexibility in the processing of combusted gases. In some embodiments, the gases from a secondarily-fueled boiler may be processed separately by using a dedicated emissions control system that is customized to control pollutants resulting from combustion of that particular secondary fuel. In other embodiments the gases may be combined with combusted gases from the primary-fueled boiler and processed via a common equipment train. This allows secondary fuels to offset primary fuels used to provide feedwater heating steam, without the emissions or operability complications incurred by co-firing multiple fuels in the same furnace.

Figure 3:
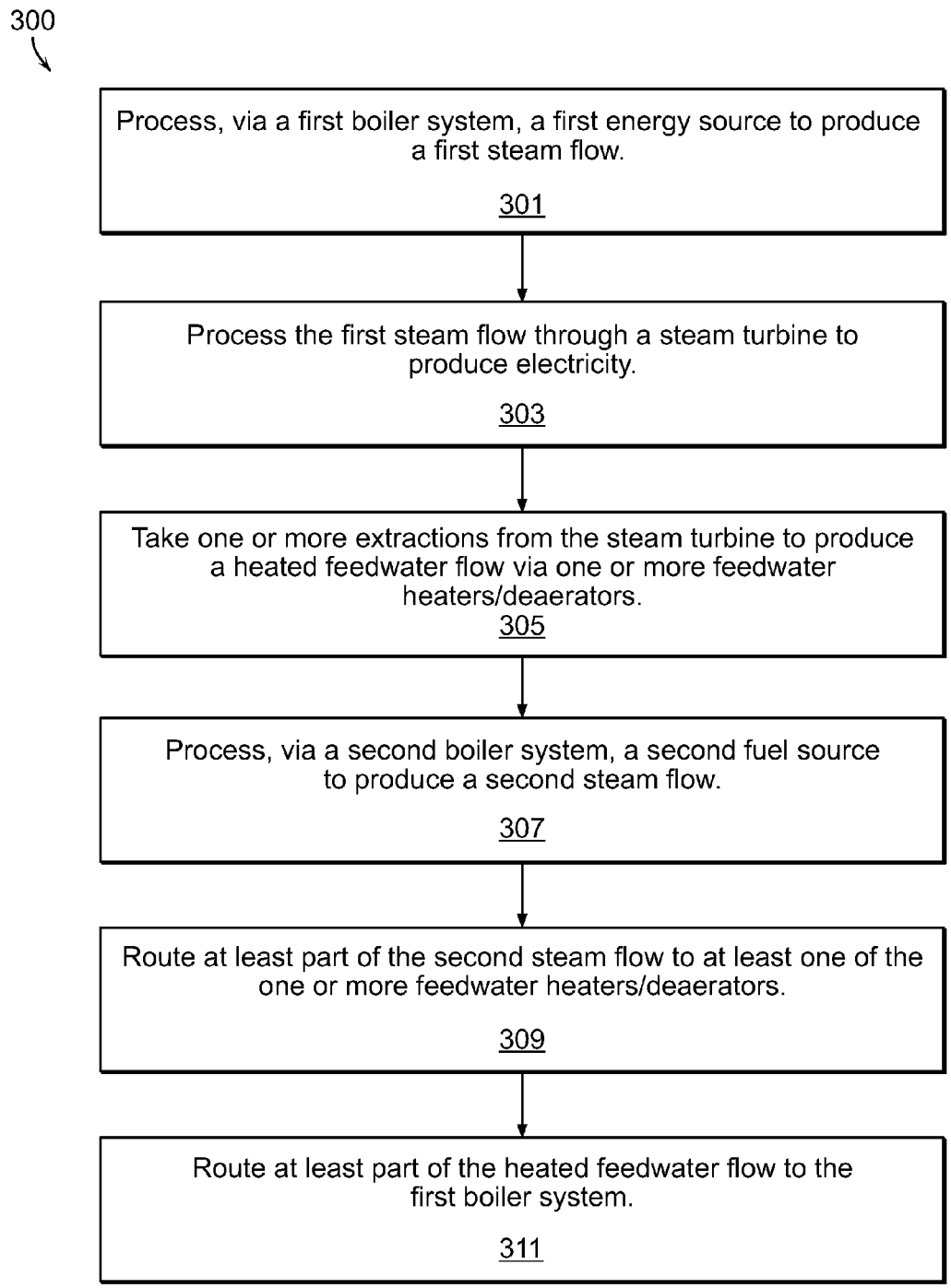
FIG. 3 shows a method for generating electrical power in accordance with various embodiments of the present disclosure.

FIG. 3 shows a method for generating electrical power 300. In accordance with various embodiments, methods may include the steps of processing, via a first boiler system, a first energy source to produce a first steam flow 301, processing the first steam flow through a steam turbine to produce electricity 303, taking one or more extractions from the steam turbine to produce a heated feedwater flow via one or more feedwater heaters/deaerators 305, processing, via a second boiler system, a second fuel source to produce a second steam flow 307, routing at least part of the second steam flow to at least one of the one or more feedwater heaters/deaerators 309, and routing at least part of the heated feedwater flow to the first boiler system 311.

In various embodiments, processing, via a first boiler system, a first energy source to produce a first steam flow 301 may include using a primary-fueled boiler to combust a primary fuel and thereby generate a steam flow of suitable temperature and pressure. It will be apparent from this disclosure that, in some such embodiments, the first boiler system will generate multiple steam flows (e.g., main steam 103 and reheat steam 105).

Processing the first steam flow through a steam turbine to produce a heated feedwater flow via one or more feedwater heaters/deaerators 303 may, in some embodiments, involve routing the steam flow through a steam turbine generator 107 having multiple sections or stages 109 as described hereinabove. A heated feedwater flow may be generated by routing feedwater through one or more feedwater heaters/deaerators as described hereinabove with reference to FIGS. 1 and 2 and/or may be generated through any other suitable means.

In some example embodiments, processing, via a second boiler system, a second fuel source to produce a second steam flow 307 and routing at least part of the second steam flow to at least one of the one or more feedwater heaters/deaerators 309 may include using a secondarily-fueled boiler to combust a secondary fuel and thereby generate a steam flow of suitable temperature and pressure. The secondary fuel may be any fuel as defined hereinabove and the feedwater heaters/deaerators may be any feedwater heater/deaerator as defined hereinabove. It will be apparent from this disclosure that, in some such embodiments, the second boiler system will generate multiple steam flows or have a single steam flow routed to multiple locations (e.g., flow to one or more feedwater heaters, flow to reheat lines, flow to deaerators, cogeneration host steam, etc.).

In many embodiments, routing at least part of the heated feedwater flow to the first boiler system 311 may include routing at least part of the heated feedwater flow 133 to a primary-fueled boiler 101 for processing.

Figure 4:
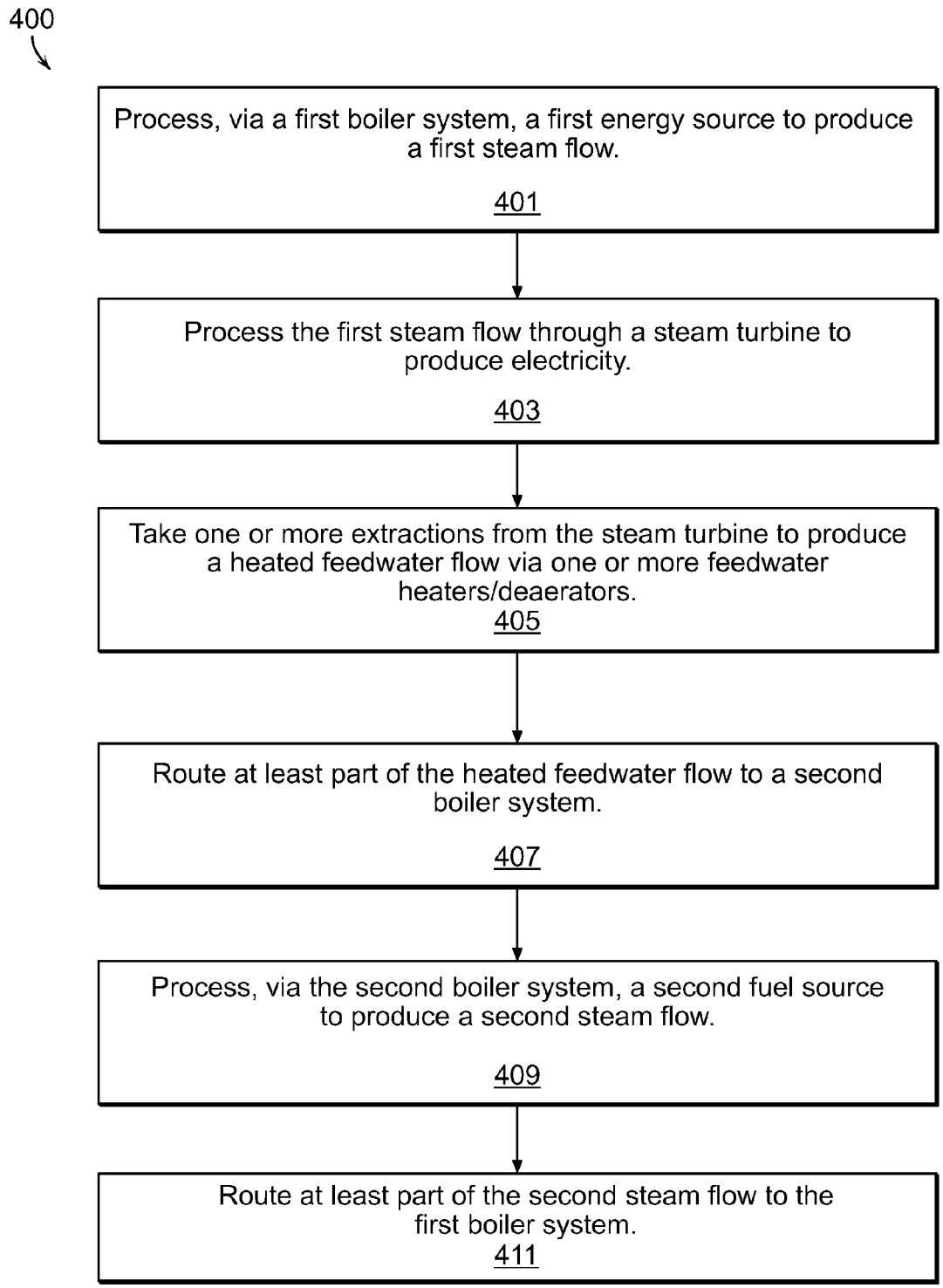
FIG. 4 shows an additional method of generating electrical power in accordance with various embodiments of the present disclosure.

FIG. 4 shows an additional method of generating electrical power 400. In accordance with various embodiments, methods may include the steps of processing, via a first boiler system, a first energy source to produce a first steam flow 401, processing the first steam flow through a steam turbine to produce electricity 403, taking one or more extractions from the steam turbine to produce a heated feedwater flow via one or more feedwater heaters/deaerators 405, routing at least part of the heated feedwater flow to a second boiler system 407, processing, via the second boiler system, a second fuel source to produce a second steam flow 409, and routing at least part of the second steam flow to the first boiler system 411.

The steps of processing, via a first boiler system, a first energy source to produce a first steam flow 401, processing the first steam flow through a steam turbine to produce electricity 403, taking one or more extractions from the steam turbine to produce a heated feedwater flow via one or more feedwater heaters/deaerators 405 and processing, via a second boiler system, a second fuel source to produce a second steam flow 409 include, but are not limited to steps 301, 303, 305, and 307 as described in reference to FIG. 3 above.

In some embodiments, routing at least part of the heated feedwater flow to a second boiler system 407 may include diverting a portion of a primary feedwater flow 203 to a secondarily-fueled boiler 201 for processing. In some such examples, as much as all of the primary feedwater flow 203 may be diverted to the secondarily-fueled boiler 201.

Routing at least part of the second steam flow to the first boiler system 411 may, in some embodiments, include routing some or all of a supplemental steam flow directly to the primary-fueled boiler 101 as a substitute for cold reheat steam 112.

Figure 5:
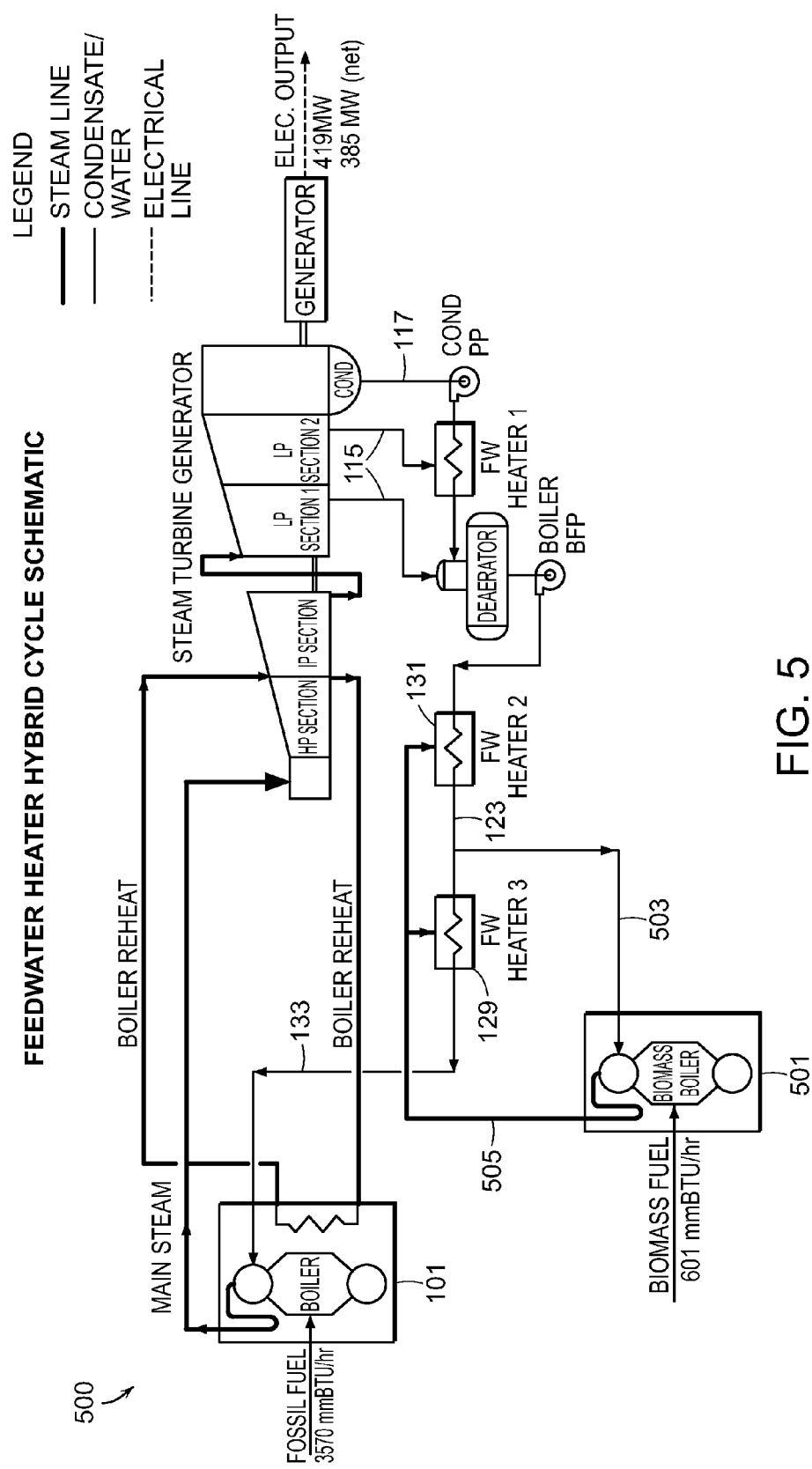
FIG. 5 shows an exemplary heat balance of an exemplary configuration of the technology, wherein the secondarily-fueled combustion system uses biomass at a firing rate of 601 MMBtu/hr (HHV), providing supplemental steam to the second and third feedwater heaters.

FIG. 5 shows an exemplary heat balance of an exemplary configuration of the technology 500, wherein the secondarily-fueled boilers use biomass at a firing rate of 601 MMBtu/hr (HHV), providing supplemental steam to the second and third feedwater heaters.

This configuration adds a secondarily-fueled boiler 501 to the configuration described with reference to FIG. 1. The secondarily-fueled boiler 501 receives diverted primary feedwater 503 and/or condensate 117 from the feedwater heating line 123 and outputs supplemental steam through a supplemental steam output line 505. The supplemental steam output line 505 then routes the supplemental steam to the second 131 and third 129 feedwater heaters, after which the heated feedwater 133 is routed to the primary-fueled boiler 101 as described in conjunction with FIG. 1.

In particular, FIG. 5 depicts an example such power plant, which uses a primary fuel of coal and a secondary fuel of wood biomass. The example plant depicted in FIG. 5 uses 3,570 MMBtu/hr (HHV) of fossil fuel and 601 MMBtu/hr (HHV) of biomass to produce 419 MW in the steam turbine and loses 34 MW to parasitic loads, resulting in 385 MW of net power produced.

Figure 6:
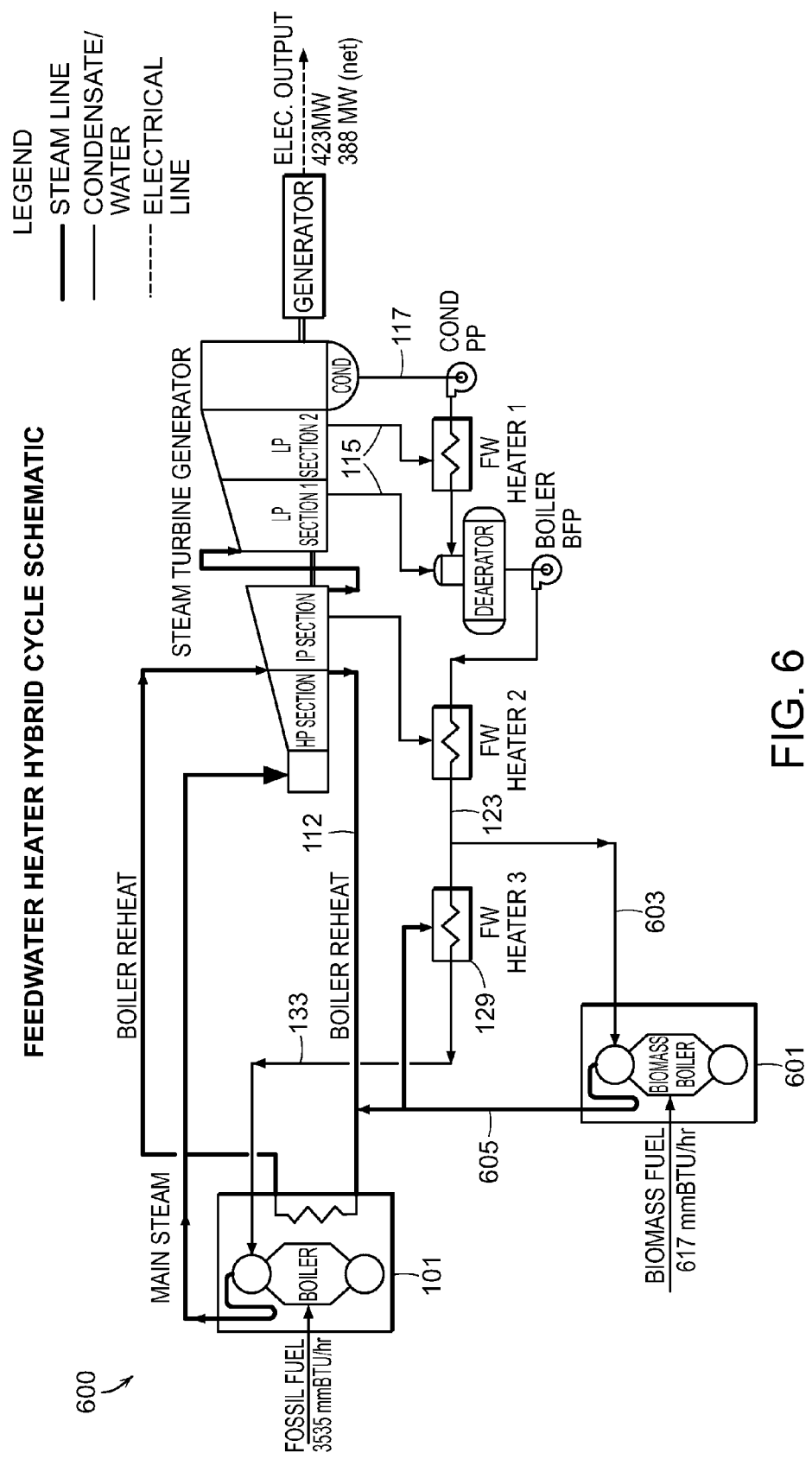
FIG. 6 shows an exemplary heat balance of an exemplary configuration of the technology, wherein the secondarily-fueled boilers use biomass at a firing rate of 617 MMBtu/hr (HHV), providing supplemental steam to the third feedwater heater and the cold reheat line.

FIG. 6 shows an exemplary heat balance of an exemplary configuration of the technology 600, wherein the secondarily-fueled boilers use biomass at a firing rate of 617 MMBtu/hr (HHV), providing supplemental steam to the third feedwater heater and the cold reheat line.

This configuration adds a secondarily-fueled boiler 601 to the configuration described with reference to FIG. 1. The secondarily-fueled boiler 601 receives diverted primary feedwater 603 and/or condensate 117 from the feedwater heating line 123 and outputs supplemental steam through a supplemental steam output line 605. The supplemental steam is then reintroduced to the third feedwater heater 129 and the cold reheat line 113.

In particular, FIG. 6 depicts an example such power plant, which uses a primary fuel of coal and a secondary fuel of wood biomass. The example plant depicted in FIG. 6 uses 3,535 MMBtu/hr (HHV) of fossil fuel and 617 MMBtu/hr (HHV) of biomass to produce 423 MW in the steam turbine and loses 35 MW to parasitic loads, resulting in 388 MW of net power produced.

FIG. 7 shows a heat balance summary table for an exemplary typical Rankine system as well as three exemplary configurations of the technology. FIGS. 1, 2, 5, and 6 correspond to the four configurations described by the table in FIG. 7.

FIG. 7 summarizes the improved performance of each configuration illustrated by FIGS. 1, 2, 5, and 6. By way of explanation, the same amount of biomass fuel used by the example hybrid cycle of FIG. 2 would generate approximately 19 MW if it were burned in a conventional parallel, standalone biomass power plant, producing a heat rate of 17,500 Btu/kWh.

In contrast, as summarized in FIG. 7, the hybrid cycle illustrated by FIG. 2 generates 24 MW (355 MW–331 MW) of new electricity attributable to the firing of biomass fuel. Thus, one particular embodiment of the present technology demonstrates a 26% increase in biomass fuel energy production and achieves a more efficient 13,750 Btu/kWh heat rate for the biomass component of the hybrid cycle.

As shown in FIGS. 1, 2, 5, and 6 and summarized by FIG. 7, the addition of a secondarily-fueled boiler to an existing primary-fueled power-producing site can increase or partially replace a portion of electricity production without a corresponding increase in the primary fuel input. This is achieved through the combination of the primary fuel and the secondary fuel utilizing the technology described herein to provide a synergistic effect during the production of electricity. That synergy is exploited by routing the steam from a secondary fuel boiler (e.g., 201, 501, 601) into a feedwater heater (e.g., 125-131), deaerator (e.g., 125), reheat line (e.g., 113), etc. of the primary-fueled generation cycle and using the displaced steam extractions to generate more electrical power in the steam turbine (e.g., 107, 507) as described hereinabove with reference to FIGS. 1-7.

In the foregoing specification, the invention has been described with reference to specific embodiments thereof. However, one skilled in the art will realize the invention may be embodied in other specific forms without departing from the spirit or essential characteristics thereof. The foregoing embodiments are therefore to be considered in all respects illustrative rather than limiting of the invention described herein. For example, each feature of one embodiment can be mixed and matched with other features shown in other embodiments. Features and processes known to those of ordinary skill may similarly be incorporated as desired. Additionally and obviously, features may be added or subtracted as desired. The scope of the invention is thus indicated by the appended claims, rather than by the foregoing description and all changes that come within the meaning and range of equivalency of the claims are therefore intended to be embraced therein.

What is claimed is:

1. A method for generating electrical power comprising:
processing, via a first boiler system, a first energy source to produce a first steam flow;
processing the first steam flow through a steam turbine to produce electricity;
taking one or more extractions from one or more low pressure (LP) sections and one or more intermediate pressure (IP) sections of the steam turbine to heat a feedwater flow in one or more feedwater heaters/deaerators;
processing, via at least one additional boiler system, at least one additional fuel source to produce at least one additional steam flow, wherein the at least one additional boiler system continuously produces the at least one additional steam flow during operation of the first boiler system;
routing at least part of the at least one additional steam flow to at least one of the one or more feedwater heaters/deaerators to further heat the feedwater flow, wherein the feedwater flow in the one or more feedwater heaters/deaerators is heated only by the at least one additional steam flow and the one or more extractions from the one or more LP sections and the one or more IP sections; and
routing at least part of the feedwater flow from the one or more feedwater heaters/deaerators to the first boiler system.

2. The method of claim 1, wherein at least one of the one or more feedwater heaters/deaerators is a heat exchanger.

3. The method of claim 1, further comprising routing at least a second part of the at least one additional steam flow to a cold reheat line between the steam turbine and a reheat section of the first boiler.

4. The method of claim 1, wherein the first energy source further comprises at least one of a fossil fuel, a municipal solid waste, a refuse derived fuel, a specific recovered fuel, and a biomass.

5. The method of claim 1, wherein the at least one additional energy source further comprises at least one of a fossil fuel, a municipal solid waste, a refuse derived fuel, a specified recovered fuel, and a biomass.

6. The method of claim 1, wherein the first boiler system comprises a Rankine steam cycle system.

7. The method of claim 6, wherein the first energy source comprises a fossil fuel and further wherein the at least one additional energy source comprises a biomass.

8. The method of claim 1, further comprising routing an emission of the first boiler system and an emission of the at least one additional boiler system to a combined emissions control system.

9. The method of claim 1, further comprising routing an emission of the first boiler system to a first emissions control system and an emission of the second at least one additional boiler system to at least one additional emissions control system.

10. A system for generating electrical power comprising:
a first boiler system configured to produce a first steam flow;
a turbine configured to process the first steam flow to produce electricity;
one or more extractions from one or more low pressure (LP) sections of the turbine configured to heat a feedwater flow in one or more feedwater heaters/deaerators;
one or more extractions from one or more intermediate pressure (IP) sections of the turbine configured to heat the feedwater flow in one or more feedwater heaters/deaerators;
at least one additional boiler system configured to continuously produce at least one additional steam flow during operation of the first boiler system; and
at least one steam line configured to route at least a first part of the at least one additional steam flow to at least one of the one or more feedwater heaters/deaerators to further heat the feedwater flow, wherein the feedwater flow in the one or more feedwater heaters/deaerators is heated only by the at least one additional steam flow and the one or more extractions from the one or more LP sections and the one or more IP sections.

11. The system of claim 10, wherein at least one of the one or more feedwater heaters/deaerators is a heat exchanger.

12. The system of claim 10, wherein the at least one steam line is further configured to route at least a second part of the at least one additional steam flow to a cold reheat line between the turbine and a reheat section of the first boiler.

13. The system of claim 10, wherein the first boiler system comprises a Rankine steam cycle system.

14. The system of claim 10, further comprising an exhaust system configured to route an emission of the first boiler system and an emission of the at least one additional boiler system to a combined emissions control system.

15. The system of claim 10, further comprising a first exhaust system configured to route an emission of the first boiler system to a first emissions control system and at least one additional exhaust system configured to route an emission of the at least one additional boiler system to at least one additional emissions control system.

16. A method for generating electrical power comprising:
processing, via a first boiler system, a first energy source to produce a first steam flow;
processing the first steam flow through a steam turbine to produce electricity;
taking one or more extractions from one or more low pressure (LP) sections and one or more intermediate pressure (IP) sections of the steam turbine to heat a feedwater flow in one or more feedwater heaters/deaerators, wherein the feedwater flow in the one or more feedwater heaters/deaerators is heated only by the one or more extractions from the one or more LP sections and the one or more IP sections;
routing at least part of the feedwater flow to at least one additional boiler system;
processing, via the at least one additional boiler system, at least one additional fuel source to produce at least one additional steam flow from the feedwater flow, wherein the at least one additional boiler system continuously produces the at least one additional steam flow during operation of the first boiler system; and
routing at least part of the at least one additional steam flow to the first boiler system.

\* \* \* \* \*